United States Patent
Holliday

[19]

[11] Patent Number: 6,139,465
[45] Date of Patent: Oct. 31, 2000

[54] INFINITE SPEED TRANSMISSION

[76] Inventor: Sander Holliday, Mühlenkamp 21, 22303 Hamburg, Germany

[21] Appl. No.: 09/333,904

[22] Filed: Jun. 16, 1999

[51] Int. Cl.$^7$ .................................................. F16H 15/20
[52] U.S. Cl. .................................. 476/52; 476/53; 476/55
[58] Field of Search .................................. 476/52, 53, 55

[56] References Cited

U.S. PATENT DOCUMENTS

| | | | |
|---|---|---|---|
| 390,216 | 10/1888 | Evans | 476/52 |
| 627,491 | 6/1899 | Evans | 476/52 |
| 680,916 | 8/1901 | Halsey | 476/55 |
| 742,977 | 11/1903 | Evans | 476/52 |
| 1,055,677 | 3/1913 | Sparks | 476/55 |
| 1,191,771 | 7/1916 | Delacour | 476/55 |
| 2,432,442 | 12/1947 | Pourtier | 476/53 |
| 2,583,790 | 1/1952 | Mikina | 476/53 |
| 5,924,953 | 7/1999 | Rohs | 476/52 |

FOREIGN PATENT DOCUMENTS

| | | |
|---|---|---|
| 878641 | 11/1998 | European Pat. Off. . |
| 298676 | 10/1928 | United Kingdom . |

*Primary Examiner*—Sherry Estremsky

[57] ABSTRACT

Transmission with a ring or belt nipped between two rotating elements of which at least one is cone-shaped. The rotating elements have two parallel lines at their closest point. The ring encompasses one of the rotating elements and directly transfers the power from the drive to the driven element by means of friction. The ring remains in a plane orthogonal to the parallel lines on the rotating elements and that plane can shift to a new point along the parallel lines by a controlling mechanism which travels in back and forth on a line parallel to those parallel lines. Thus the ratio of the cross section of the two rotating elements changes and the device constitutes an infinite speed transmission. If one of the rotating elements is cylindrical instead of cone-shaped, there is the possibility of achieving better traction on the side of the ring which touches the cylinder through a wider contact surface or else through a geared tooth contact instead of a friction contact.

3 Claims, 3 Drawing Sheets

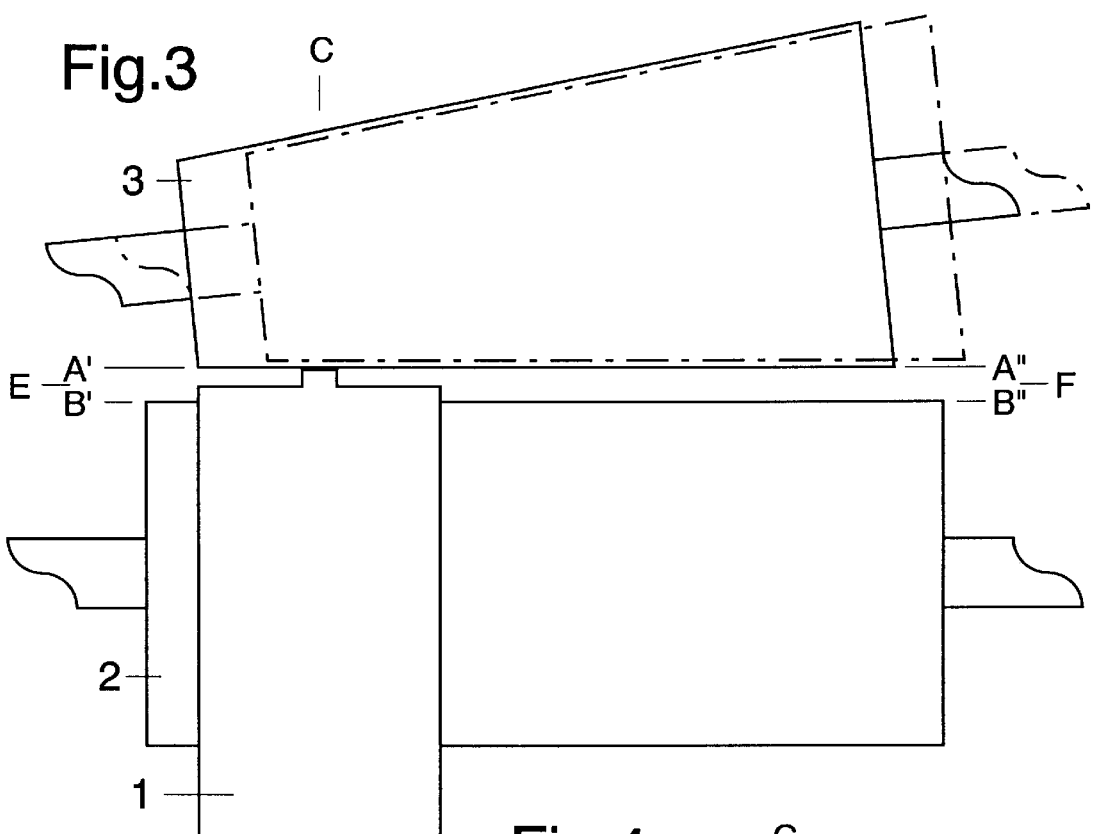
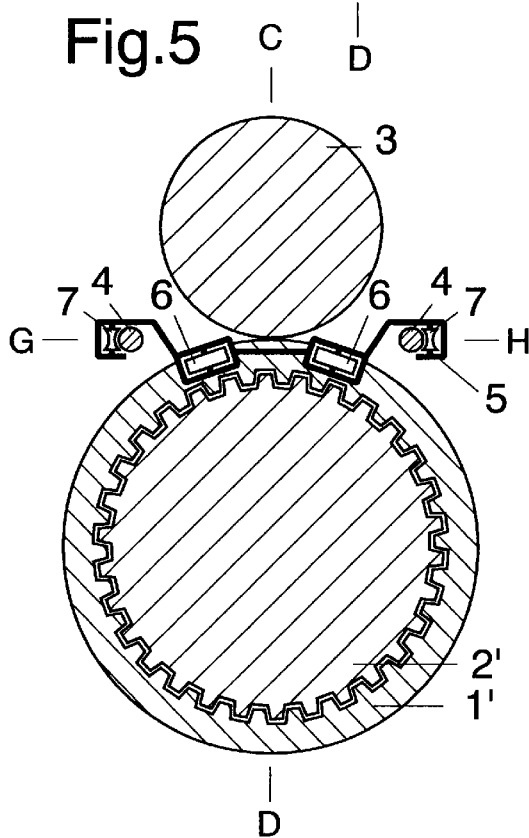
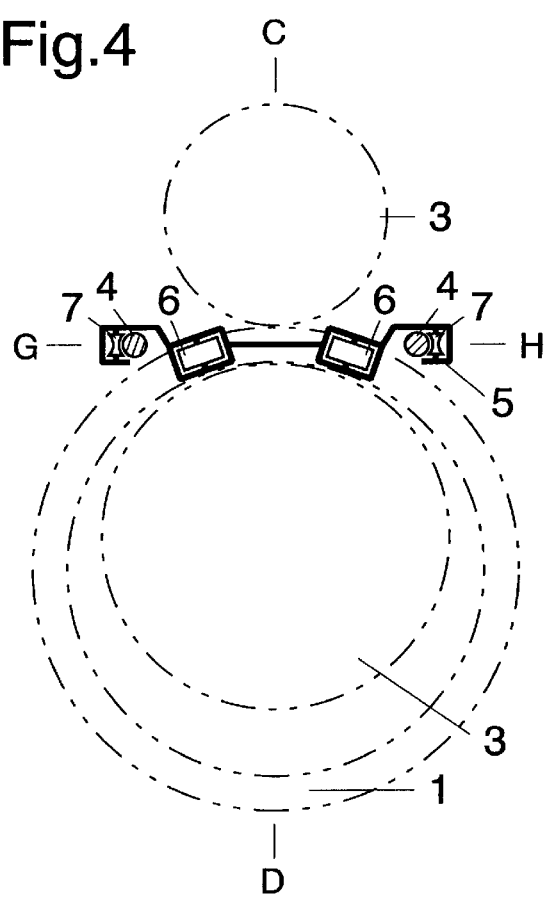

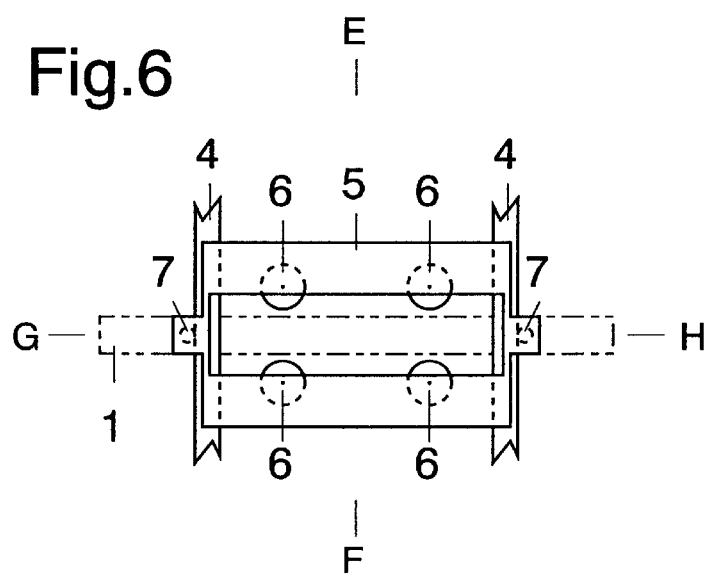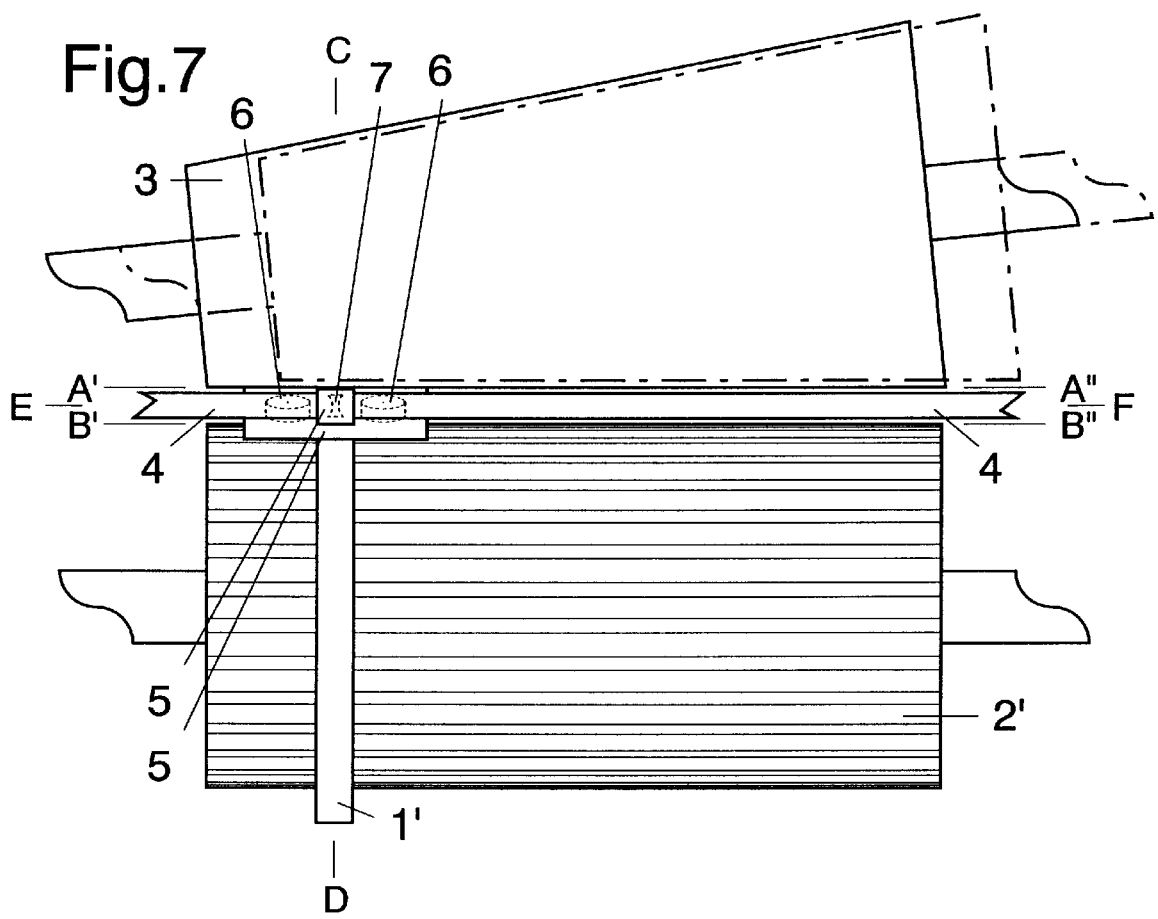

INFINITE SPEED TRANSMISSION

BACKGROUND OF THE INVENTION

1. Field of the Invention

This invention relates to infinite speed transmissions with power transferred from a drive shaft to a driven shaft by a ring or belt nipped between them.

2. Background Art

Infinite speed drives are known in many varieties. The discussion here shall focus on those in which two cones, or a cone and a cylinder (which is a cone of 0°), oppose each other. The axes of both cones are in a common plane. The two cones have two parallel lines between them at their closest point and the power is transferred by a ring or belt which encompasses one of the cones and is nipped between them.

In any friction drive, loss through slippage is one of the main disadvantages over a drive in which gears mesh distinctly. Slippage can be reduced or overcome by increasing contact pressure, but often at the cost of jamming (which hinders shifting), stalling, or excessive bearing wear.

An infinite speed drive, or continuously variable transmission (CVT), has the conflicting goals of maximizing rotative friction, which is necessary for transmitting power, while minimizing lateral friction, lateral friction being detrimental to shifting. The heavier the load on the drive, the more pressure must be applied and this will amount to more friction, both rotative and lateral. The design of the present invention addresses the problem of undesirable lateral friction, which inevitably comes with the high pressure needed for rotative friction.

In friction drives involving cone-shaped shafts, there is also a problem caused by the speed differential along the surface of the cone at a given rotation. The intermediate ring is in contact with the cone along a line, not just at a distinct point. The point on that line which is closer to the large end of the cone is moving faster than the point at the smaller end. This causes the ring to twist. This tendency is further pronounced in the opposing cones model. The point on the drive shaft side small end is moving more slowly than the drive shaft side large end. The drive shaft side small end is opposite the driven shaft side large end which has more resistance in trying to cause the driven shaft to rotate, further pulling the ring out of its ideal plane. Henceforth, this phenomenon shall simply be referred to as the "twist problem".

The design of the power transfer mechanism must meet two contrary ideals. The ring or power transfer mechanism must be as wide as possible in order to achieve maximum traction, and must be as narrow as possible to minimize the twist problem and to facilitate the lateral movement needed for shifting.

A listing of prior art follows with a very short description of the invention. Each patent discloses a CVT either with two opposing cones or with a cone and a cylinder. Some disclose both types. Each has a belt, ring, or wheel (or a multiplicity of one of these three) as the power transfer element.

Evans (U.S. Pat. No. 390,216 October 1888, U.S. Pat. No. 627,491 June 1899, and U.S. Pat. No. 742,977 November 1903) teaches a device with two cones and a belt.

Halsey (U.S. Pat. No. 680,916 August 1901) teaches a cone and cylinder device with a ring.

Sparks (U.S. Pat. No. 1,055,677 March 1913) and Delacour (U.S. Pat. No. 1,191,771 July 1916) each teach a device with a wheel on a rod (variation of a ring on a cylinder) pressed against a cone.

Garrard (GB 298,676 October 1928) teaches a device with two cones and a ring.

Pourtier (U.S. Pat. No. 2,432,442 December 1947) discloses a two cone device with a ring surrounding each cone, each ring making a friction contact with its cone and the two rings transferring power from the one to the other by means of gearing.

Mikina (U.S. Pat. No. 2,583,790 January 1952) discloses a cone and cylinder device as well as one with two opposing cones, both versions using two power transfer elements.

Rohs (EP 878,641 November 1998 and later as U.S. Pat. No. 5,924,953) discloses two cone device in which the ring moves parallel to the shafts of the cones.

Each will be discussed later in greater depth to demonstrate in what manner the device previously disclosed is more bulky, more complicated in design, or less capable either of operating under a heavy load or of dealing with the twist phenomenon than the present invention.

BRIEF SUMMARY OF THE INVENTION

Three embodiments of the present invention are disclosed, one with two opposing cones (FIG. 1) and two with cone and cylinder (FIG. 3 and FIG. 7). All three have a ring (or belt) controlling mechanism for this ring or belt which rides on a line parallel to the generatrices of the two cones or cone and cylinder. This has two advantages. First, the "valley" between the two rotating objects is "wasted spaced". By placing the control mechanism there the entire device is less bulky than if it were placed farther away. Second, by controlling the power transfer element close to the point of maximum resistance a greater overall load is possible for the device. The force required for lateral movement is less than if that force were applied farther away, meaning a simpler, lighter weight construction is needed. If the contact with the power transfer element is via wheels which ride on a plane tangent to the travel of the belt or ring, then much lateral pressure can be put on the ring or belt without hindering its rotative movement. (FIG. 4)

The three devices of Evans are similar to the two cone embodiment. A belt encompasses one of the cones and the controlling mechanism rides on a line parallel to the parallel lines of the cones. But the controlling mechanism is a simple U-shaped carriage, which impedes rotative movement as it rubs against the side of the belt in checking twist and wobble in normal operation, not to mention during shifting, especially shifting in heavy load (high friction) situations where lateral pressure must be very high. Anything which hinders free movement of the belt or ring in the rotative direction is undesirable. The present invention, in contrast to the devices of Evans, has wheels riding in a plane tangent to the line of travel of the ring or belt, these wheels being the only lateral force on the belt and offering extremely little drag in the rotative movement of the belt, even when extreme lateral pressure must be applied, as when shifting under a heavy load. (FIGS. 4, 5, 6, 7 part 6).

Halsey teaches a device with a cone and a cylinder, the cylinder having a key on it to hold a wheel, in contrast to the present invention the controlling mechanism does not move in a line parallel to the parallel lines but rather in an arc defined by the controlling lever. This has two disadvantages. First, the device is bulkier than necessary due to the lever. Second, the contact points on the lever must be farther apart at the extremes than they would have to be in the middle in order to accommodate the angle. This means that in the middle area, the contact points would be of little use in controlling wobble. The problem would be somewhat reduced if the radius of the arc were increased, but then the device would be even larger, further adding to the problem of bulk.

Both Sparks and Delacour disclose devices in which a wheel is loosely fixed (by a key connection) to a rod and pressed against a cone as opposed to a cylinder nipping a ring against a cone in the present invention. In cross section, a wheel on an axle may seem like a ring around a cylinder. But there are two significant differences. First, with the road and wheel, a small mass (the rod) must exert a great pressure on the large mass (the wheel) to maintain a given level of traction, whereas a large mass (the cylinder) with a flatter tangent at its contact point to the inner side of the ring need not exert as much pressure on the small mass (ring or belt) to nip it against the cone and maintain the same level of rotative friction. Second, the wheel or the ring has two points of resistance (the greater one being the one with the cone). A controlling mechanism making contact close to the rod will not be as effective at the outer edge near the cone and vice versa. With the cylinder and thin ring (thin in cross section relative to the wheel) the contact point with the controlling mechanism is near both points of resistance. In the model of both Sparks and Delacour the lateral pressure is near the rod instead of being near the cone, where it is more needed.

Garrard teaches a two cone device in which the controlling mechanism travels parallel to the shafts instead of to the generatrices. This has two disadvantages over the present invention. First, the device is more bulky than it need be. Second, the controlling mechanism can not be as close to the point of maximum resistance and is thus less efficient.

Pourtier discloses a two cone device with a ring around each cone and gear teeth on the outside of the rings. Although the meshing gears are not subject to slippage, there are still two friction contacts necessary for transferring power, namely the inner side of each ring with the cone it encompasses. The problem of moving two rings instead of one add to the design difficulties, as does the problem of controlling twist and wobble in both rings. The present invention uses a single ring or belt.

Mikina also discloses a device with two belts, although without the gear teeth on the outside of the belts. One device is with two cones and the other is with cone and cylinder. Both display the same problems just mentioned in the device of Pourtier. Controlling two belts is more complex than controlling one. (Mikina also discloses an embodiment with two idler wheels, which is out of the scope of the disclosure of the present invention.)

Rohs discloses a two cone model in which the ring travels inside a cage which surrounds the cone which encompassed by the ring, making the device significantly bulkier and more complex than the present invention.

BRIEF DESCRIPTION OF THE SEVERAL VIEWS OF THE DRAWINGS

For all embodiments of this invention, and for all the explanations and drawings thereof, the following observations remain constant:

1. The inner parallel lines are the lines A'-A" and B'-B". The line exactly halfway between them is the line E-F.
2. A line C-D is perpendicular to E-F and crosses through the axis of both the drive and driven shaft.
3. The line perpendicular to E-F and C-D is the line G-H.
4. These three lines, E-F, C-D, and G-H constitute a three dimensional space.
5. The ring travels on a plane defined by the lines C-D and G-H. This plane is substantially orthogonal to the line E-F.
6. During operation the point along the line E-F where this orthogonal plane is located can shift, but the new plane is always substantially orthogonal to E-F. For the sake of simplicity this plane shall still be referred to as the plane defined by C-D and G-H, and not by C'-D' and G'-H', C"-D" and G"-H", and so on.
7. All figures are on one of the planes defined by two of the axes of this three dimensional space, C-D and E-F for front views, C-D and G-H for cross section from side, or G-H and E-F from above.

Explanation of figures (plane of view in parentheses)

Figure 1:
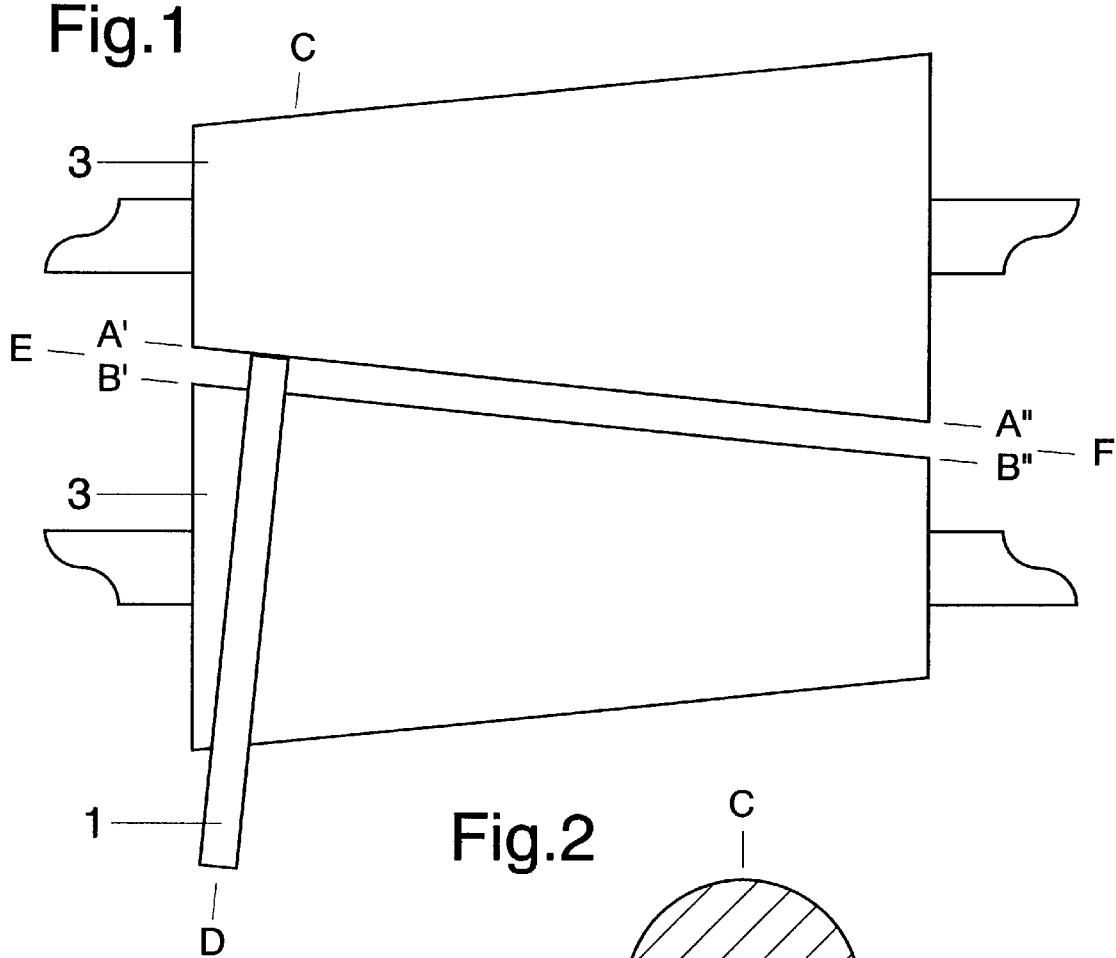

FIG. 1 Opposing cones drive, front view (C-D and E-F)

Figure 2:
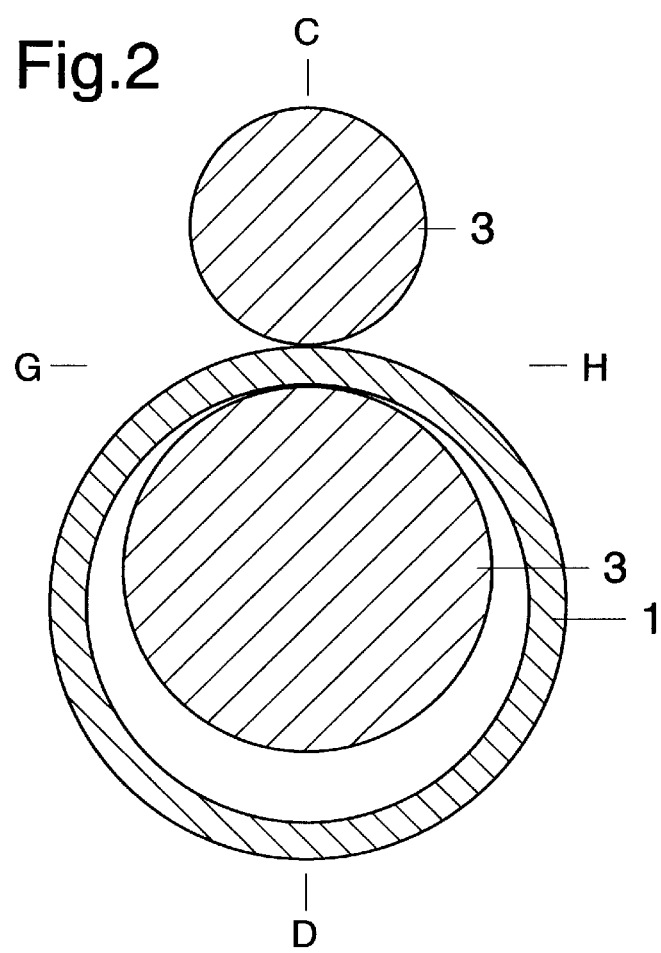

FIG. 2 Cross section of intermediate ring drive (C-D and G-H)

FIG. 3 Cylinder plus cone drive front view (C-D and E-F)

FIG. 4 Ring controlling mechanism on ring's plane of travel (C-D and G-H)

FIG. 5 Geared cylinder and ring with gear teeth on inside (C-D and G-H)

FIG. 6 Ring controlling mechanism from top (E-F and G-H)

FIG. 7 Cone and geared cylinder drive, front view (C-D and E-F)

Reference Numerals to the Drawings

1. Ring (or belt)—Power transfer mechanism
   1' Same but with geared teeth on inside (FIGS. 5 and 7)
2. Cylindrical rotating element (can be drive or driven shaft)
   2' Same but with geared teeth on outside (FIGS. 5 and 7)
3. Cone-shaped rotating element (can be drive or driven shaft)
4. Guide for ring controlling mechanism
5. Frame for ring controlling mechanism (Please note that the line for this in FIGS. 4 and 5 is substantially thicker than the normal lines for the outline of parts. That is because this line is not an outline, but rather represents the entire thickness of that part from this view.)
6. Wheel (to apply lateral pressure to ring or belt)
7. Roller (to keep controlling mechanism on guide)

DETAILED DESCRIPTION OF THE INVENTION

Two rotating elements, one a drive shaft and one a driven shaft, are so positioned that their axes are in the same plane. This plane intersects the surface each of these rotating elements on two lines. The closer of these lines on each rotating element are parallel to each other, henceforth referred to as the "inner parallel lines" (A'-A" and B'-B" in all drawings). A ring or belt, which is the power transfer device from the drive to the driven shaft, is approximately as thick as the distance between these inner parallel lines and is nipped between these lines. At least one of the elements is cone-shaped (FIGS. 1,3, and 7). In the embodiment where the second is cone-shaped as well, it is facing in the opposite direction to the first (FIG. 1).

A lateral movement control mechanism (FIGS. 4 and 6) rides along a path parallel to these inner parallel lines and as close as possible to them, since this is where the resistance is. This controlling mechanism need not be in constant contact with the ring or belt. The ring or belt is essentially free floating and the lateral movement control mechanism has only three essential functions. First, it can keep the twist problem in check and reduce wobble. Second, it can prevent the ring or belt from wandering to a new plane, that is from shifting all by itself. And third, it can do the opposite, namely force the ring or belt into an new plane, when shifting is indeed desired.

The first embodiment is a double cone device. (FIG. 1)

The controlling mechanism for the ring (FIGS. 4 and 6, not shown in FIG. 1) rides along a path parallel to E-F and comes into lateral contact with the ring very close to the nipping point. This is where the resistance is and this is where the pressure is needed. In the rest of its path the ring is essentially free floating.

By putting the controlling mechanism closer to the point of resistance and guiding it along the line E-F, there are several advantages. First, the device is smaller. Second, the mechanism can be lighter in construction since its pressure is being applied much closer to the point of resistance. Third, if the control of the ring is not so far from the point of resistance, then the ring can even be made of a flexible substance, such as a rubber, like a fan belt. It will stay more or less circular through centrifugal force, but its exact path is actually irrelevant away from the nipping point. A flexible belt could be cheaper to manufacture than a stiff ring and would give better traction. Fourth, by controlling the ring very close to the nipping point, it is easier to reduce the tendency of the ring to twist out of its plane of travel.

In a second embodiment one rotating element is a cylinder (FIG. 3, controlling mechanism not showing) and the other is a cone. By making one of the rotating elements a cylinder, the overall gear ratio range is only the square root of what it is if both elements are the same cone. But in compensation for that, the traction on the cylinder side can be greatly improved. The ring (FIG. 3, part 1) can be very wide on the cylinder side, since the twist problem is no longer there where all points on the cylinder move at the same speed at a given rotation. On the cone side, a narrower surface area would be necessary because of the twist problem.

But once the speed differential problem is taken away on the cylinder side, the ring can even have distinct gears on the cylinder side, or even be just as large as the cylinder. This leads us to the third embodiment. A cone and a cylinder with a ring around the cylinder. The inside of the ring has gear teeth which mesh with the surface of the cylinder, which itself is a gear along its entire working length. Compare FIG. 2 and FIG. 5. When the ring surrounds a cone, it must be somewhat larger than the cone at its widest spot and preferably by more than just a small amount to avoid scrubbing tendencies with the cone on the inside face of the ring. But a geared ring can fit exactly around the cylinder, making the entire device less bulky. (Note that the cross section in FIG. 5 purposely has a small space between the cylinder and the ring to emphasize visually the independent nature of the ring. In an actual design, a closer fit would probably be desired. But in principle it would even be possible to have a ring larger than the cylinder, as long as the teeth on the inside mesh with the teeth of the cylinder.) Since the gears on the cylinder and the inside face of the ring mesh, the controlling mechanism no longer needs to prevent wobble or reduce twist. Additionally the resistance to being moved laterally is less on the cylinder side, where the contact is of two hard surfaces and not a frictional contact. (Most likely, such a ring would have a smooth surface on the inside, the side which contacts the geared cylinder and a frictional surface on the outside, where it is in contact with the cone). The nipping point on the cone side is still the point of greatest resistance. But a very light lateral pressure at just one point on the ring would suffice to hold the ring to move it to a new plane. And the gears hold the ring in its plane, eliminating twist and wobble.

It may seem at first glance that this model is like infinite speed drives which are of the opposing cone type and which have an intermediate wheel transferring the power. A significant difference however, is that the ring is not an idler wheel, but rather directly connected to the drive or driven shaft, its own shaft helps hold it against the cone. Intermediate idler wheel models suffer from the wheel being pushed away from its ideal tangential contact with the two cones. Clutching is necessary on both sides of the wheel. They are generally only suitable for very light loads.

Following are some general observations to help in the understanding and aid in the construction of any of the three models discussed.

In all embodiments, wherever a rigid element comes into contact with a non-rigid element, grooves on the rigid element which run parallel to the length of the rotating elements (lines A'-A", B'-B") will increase traction and facilitate shifting. Although it is more likely that the cylinder and cone would have a rigid surface, it is conceivable that they could have a frictional surface (except in the case of a cylinder with gear teeth) and that the ring would be rigid. In this case, grooves on the ring parallel to E-F would serve this function. Lengthwise grooves also serve another function on a contact between a cone and a ring or belt. If the rigid side (again, more presumably the cone) has slight ridges and valleys running parallel to E-F, then the less rigid side (presumably the ring) will have "somewhere to go". The part of the belt closer to the small side of the cone can "hide" its "excess length" in the valleys of the grooves. It is not possible on a cone to make grooves which run the entire length, do not change thickness, and remain equally spaced. But it is possible to have a pattern of staggered shorter grooves which, at any given cross section of the cone approximate grooves more or less equidistant, and grooves of more or less equal width.

In continuously variable drives, a common problem is stalling. If too much nipping pressure is needed to provide sufficient traction, then the power transfer element can not be moved laterally to a new point. If, however, a cone-shaped shaft in an intermediate ring drive is able to move back and forth along its axis, then the nipping pressure can be adjusted, because the distance between the inner parallel lines changes. See FIGS. 3 and 7. A second position is shown for the cone with a phantom line. The surface of the cone is no longer on the line A'-A". The new position of the surface of the cone is farther away from the line B'-B", thus increasing the distance between the shafts and reducing or even completely eliminating nipping on the ring or belt. The cone can be held in its operating position by a spring and a clutch bearing. Such clutches are well known and thus need no further elaboration here. The drawings do not show the clutch, only an alternate position of the cone. FIG. 1 does not show an alternate position of either of the cones.

Inasmuch as the novelty of this invention in the double cone models lies in the controlling mechanism, it is necessary to make a few observations about the mechanism. First, the ring is always at the origin of the three dimensional space defined by the axes C-D, E-F and G-H. Thus the controlling mechanism can not also be at this point. If the mechanism intersects the line E-F, then it must straddle the ring or belt on the E-F, G-H plane (see FIG. 6 part 5). Second, if the controlling mechanism crosses between the rotating elements, then the thickness of the controlling mechanism must be less than the distance between A'-A" and B'-B" (part 5 FIGS. 4 and 5) at the place where it crosses between the two rotating elements. Otherwise it would rub against at least one of the shafts, impeding movement. Indeed, the contact point of the controlling mechanism with the ring can be right on the line E-F, provided that the wheel and the frame holding the wheel are narrower at that point than the distance between the parallel lines. Third, the controlling mechanism need not cross between the rotating elements. It could be on just one side of the drive. The number of guides is also unimportant. It is only crucial that the guide or guides be parallel to E-F, in order to bring the controlling mechanism in as close as possible to the point of resistance. In the cone plus cylinder model, the need for lateral pressure is even less, making an even simpler and lighter construction possible. Depending on load and materials, a single contact point on the ring on the left and right might suffice to control the ring.

What is claimed is:

1. A device comprising:

two opposing cones, one a drive shaft and the other a driven shaft, said cones having axes in a common plane, said cones intersecting said common plane on two parallel lines, a power transfer element chosen from the group consisting of substantially rigid rings and substantially flexible belts, said power transfer element encompassing one of two said cones, said power transfer element being approximately as thick as the distance between said parallel lines and said power transfer element being nipped between said cones, a controlling mechanism for applying lateral pressure on said power transfer element, said controlling mechanism moving back and forth on a line substantially parallel to said parallel lines, said controlling mechanism making contact with said power transfer element at a distance from said common plane no greater than the greatest distance from said common plane to either of said cones, said controlling mechanism making contact with said power transfer element via wheels, said wheels traveling in a plane substantially tangential to said power transfer element, whereby such device constitutes a continuously variable transmission.

2. A device comprising:

a cone and a cylinder having axes in a common plane, said cone and said cylinder intersecting said common plane on two parallel lines, a power transfer element chosen from the group consisting of substantially rigid rings and substantially flexible belts, said power transfer element encompassing said cylinder, said power transfer element being approximately as thick as the distance between said parallel lines and said power transfer element being nipped between said cone and said cylinder, a controlling mechanism capable of applying lateral pressure on said power transfer element, said controlling mechanism moving back and forth on a line substantially parallel to said parallel lines, whereby such device constitutes a continuously variable transmission.

3. A device comprising:

a cone and a cylinder having axes in a common plane, said cone and said cylinder intersecting said common plane on two parallel lines said cylinder having lengthwise grooves such that said cylinder is a wide gear, a power transfer element, said power transfer element being a substantially rigid ring encompassing said cylinder, said ring having gear teeth on the inside meshing distinctly with said grooves of said cylinder, said ring being nipped between said cone and said cylinder and having friction contact with said cone, a controlling mechanism capable of applying lateral pressure on said ring, said controlling mechanism moving back and forth on a line substantially parallel to said parallel lines, whereby said device constitutes a continuously variable transmission with a geared contact on said cylinder and a friction contact on said cone.

* * * * *